though certain specific details will be described in their preferred form, there are many obvious modifications and alternatives which will become apparent to those skilled in the art and the invention will be particularly pointed out in the claims.

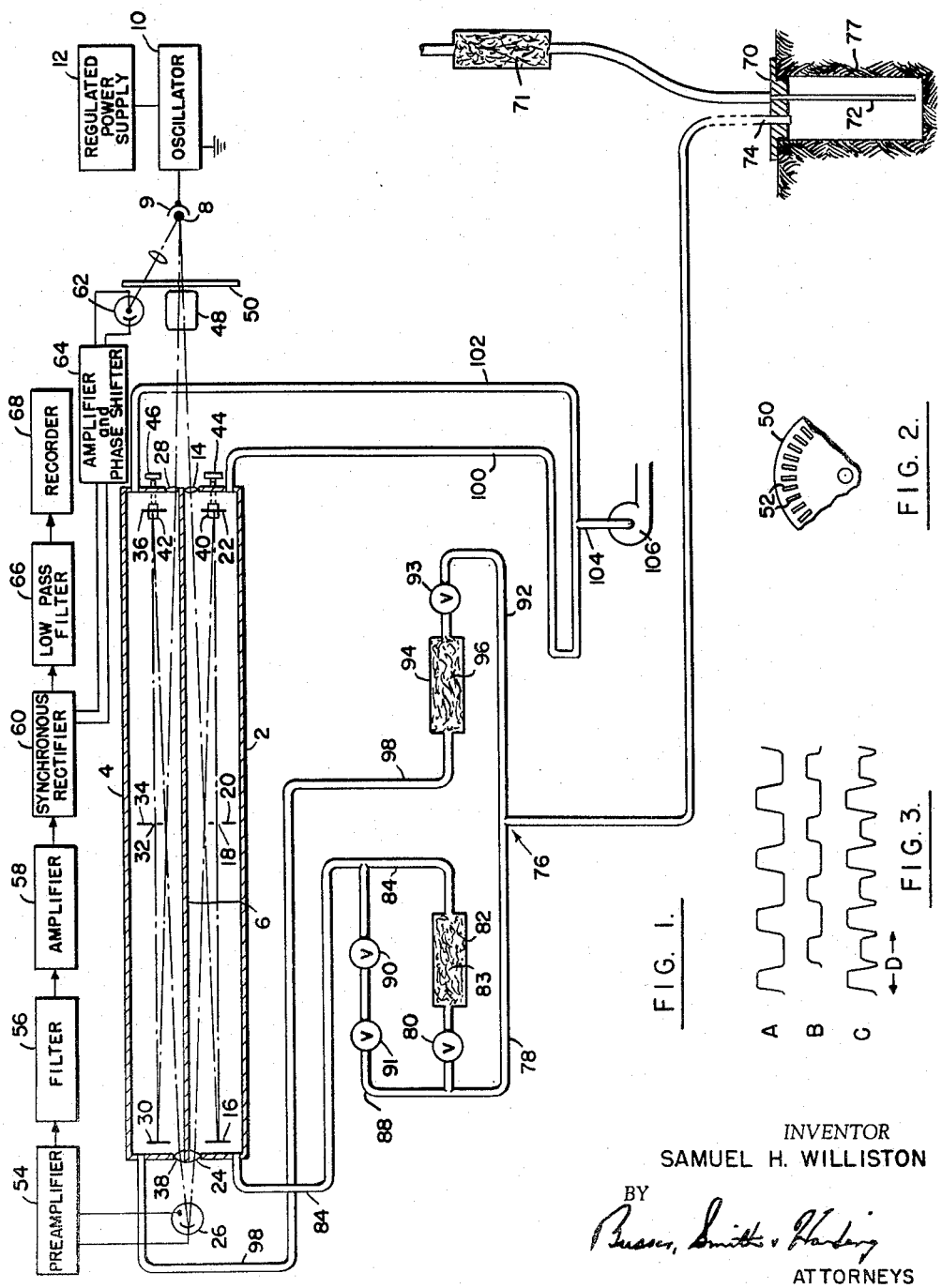

United States Patent Office
3,178,572
Patented Apr. 13, 1965

3,178,572
ULTRA-VIOLET RADIATION ABSORPTION ANALYSIS APPARATUS FOR THE DETECTION OF MERCURY VAPOR IN A GAS
Samuel H. Williston, Los Altos, Calif., assignor to Cordero Mining Company, Palo Alto, Calif., a corporation of Nevada
Filed May 17, 1963, Ser. No. 281,088
6 Claims. (Cl. 250—43.5)

This invention relates to a method and apparatus for detection and measurement of mercury vapor in air, and particularly for measurements of extremely low vapor concentration.

The objects of the invention may be best appreciated by consideration of concentrations of mercury vapor which may exist in air. Ordinary air saturated with mercury vapor at ordinary temperatures may contain around $1.5 \times 10^{-2}$ grams of mercury per cubic meter. Heretofore detectors have been provided capable of indicating concentrations of the order of $1 \times 10^{-4}$ grams of mercury per cubic meter. Such detectors have been used primarily for the warning of health hazards which are usually considered to exist if the concentration of mercury rise above about $3 \times 10^{-4}$ grams per cubic meter, and such devices are satisfactory for warning purposes, as of leaks in mercury boilers, chemical laboratories, and the like. In accordance with the present invention measurements of mercury concentration may be made when the air contains less than $4 \times 10^{-9}$ grams per cubic meter, and measurements may be made under conditions of continuous flow of air.

In our application Serial No. 177,951, filed March 5, 1962, there is disclosed an apparatus for detection and measurement of mercury vapor in concentrations such as that just mentioned.

While the apparatus in said application, and in the present one, may obviously be used for the general detection of minute amounts of mercury vapor in air, its particular utility is in the detection of subterranean mineral deposits containing mercury. It has been found that over mercury ores there will exist concentrations in the air greatly exceeding the concentrations measurable by the apparatus. During a normal California day in the Coast Range, the mercury content of air eight feet above the ground will range from $4 \times 10^{-8}$ to $8 \times 10^{-8}$ or more grams per cubic meter, this being at locations remote from mines and manufacturing plants using mercury. Over mercury ores which could be economically worked this concentration greatly increases.

It may be here remarked that though the workable deposits of mercury throughout the world are usually in the form of cinnabar, this seems always to contain free mercury, often actually visible therein in the case of deposits near the surface. Theory has it that this free mercury results from oxidation of the sulphide and then, or possibly directly, reduction by organic materials, so that the detectability of mercury deposits is not due to direct detection of the relatively nonvolatile sulphide but rather to the accompanying free mercury.

The foregoing is not only true of ores from which mercury may be economically extracted, but it is also true in the regions above other mineral deposits which may contain, in themselves, only very small amounts of mercury, such as deposits of silver, gold, lead, antimony and zinc. The apparatus is accordingly designed particularly for the purpose of prospecting to locate potential ores not only of mercury but of these other metals.

The principle involved in said prior application and in the present one is that of detection of absorption of ultraviolet radiation by mercury vapor, this being carried out in a highly sensitive and reliable fashion. Both types of apparatus may be made portable so that they may be carried by an airplane flying over regions subject to the search for ores. If mercury is thus detected better and more accurate measurements may be made by the same types of apparatus carried by a truck and used to examine the regions of interest more carefully.

While the apparatus of said prior application has been found highly satisfactory and useful, for very high sensitivity work extremely careful adjustment must be made and maintained. The detection system, furthermore, is of direct current type which, as is well known, requires the exercise of great care in operation to eliminate effects of drift. Balanced vacuum type photocells are used because of their high stability, but these inherently lack the sensitivity characteristic of multiplier photocells. However, the latter are extremely difficult to handle and maintain in proper operation, and proper balancing of a pair of these against each other is only feasible under the most careful laboratory conditions.

The general object of the present invention is to provide an apparatus operating on the same general principles as that disclosed in said prior application but having very substantial advantages in setting and maintenance.

First, the present invention makes possible the use of a multiplier photocell with the advantages of its very high sensitivity. The use of a multiplier photocell is made possible by providing an optical system which may be adjusted to provide illumination of even the same cathode area of the photocell by illumination passing along two distinct paths, one of which passes through a mercury-free region while the other passes through a region containing the air to be examined. Furthermore, the illumination along the two paths is derived from substantially the same source region of a mercury vapor lamp. By alternate chopping of the beams of illumination, alternating signals are derived from the photocell. These alternating signals may then be highly amplified and filtered and ultimately measured utilizing the technique of synchronous rectification with its high discriminatory effects against noise as well as other signals incident to the operation. While multiplier photocells are quite unstable with respect to direct outputs, they are quite reasonably stable with respect to alternating signals at least over intervals which greatly exceed the periods of the signals producible by practical chopping. As a result of the foregoing disturbing factors which have long time periods are of little consequence in establishment of highly sensitive operation.

A further object of the invention has to do with the achievement of a considerable betterment of the ratio of desired illumination to background illumination thereby making discrimination of the useful signals against a high background more readily achievable. In brief, a quite effective, even though incompletely effective, monochromator arrangement is provided merely by taking advantage of the fact that simple quartz lenses are not achromatic. This aspect of the invention is useful even if less sensitive photocells than multiplier photocells are used.

The foregoing general objects as well as others relating to details of construction and operation will become apparent from the following description, read in conjunction with the accompanying drawing, in which:

FIGURE 1 is a mechanical-electrical diagram illustrating a preferred embodiment of the invention;

FIGURE 2 is a fragmentary view showing the construction of the chopper for the illumination; and FIGURE 3 is a wave diagram illustrative of the operation of the apparatus.

While, as will become obvious, certain aspects of the apparatus may be used for the specific detection of minute amounts of other substances, its primary utility is in the specific detection of mercury vapor, its arrangement being such that mercury vapor alone is detected to the exclusion of other substances which might be present and which would effect absorption in the same bands of the spectrum as mercury.

Referring to FIGURE 1, there are shown at 2 and 4 a pair of tubes which, as will appear later, contain air samples which are to be compared. In brief, one of these, in this case tube 4, will contain flowing air containing the mercury vapor, while the other tube 2 will contain air from the same source but with the mercury vapor removed. These tubes, desirably blackened internally by a baked enamel, are closed except for lens elements formed of quartz or ultraviolet-transmitting glass. The tubes are desirably of substantially identical dimensions, and are separated by a plane wall 6, so that the tubes may be close to each other to provide an optimum optical system, as will appear.

A mercury vapor light source is provided at 8 and emits the characteristic radiation of ionized mercury vapor. Desirably, as indicated, this is in the form of a tube of small diameter extending perpendicular to the plane of FIGURE 1. The mercury lamp tube is most desirably of ordinary low pressure type such as is commonly used for therapeutic purposes, such a tube being superior to a high pressure lamp in that the most useful radiation is in the 2537 A. band which is reversible, and in a high pressure lamp the mercury vapor about that region which is emitting may provide substantial absorption cutting down the effectiveness of the useful radiation. In a low pressure lamp about 75% of the radiation is in the 2537 A. band, the remainder being in the high ultraviolet and in the visible band. A small diameter tube is used to provide what is substantially a line source. While the illumination may then not be as intense as may be secured from a larger diameter tube, an advantageous optical system is thereby simply secured, as will become more apparent later, and the high sensitivity of the multiplier photocell which is used makes high intensity illumination unnecessary.

For present purposes, the tube 8 is not desirably energized by current flowing conventionally between electrodes, since it is found that the energization, by low frequency alternating current, causes plasma oscillation and reduces the overall sensitivity of the apparatus. Instead, therefore, electrodes may be grounded and excitation is provided at high radio frequency by surrounding the tube with an exterior electrode provided with an opening through which the radiation may pass from the tube. Excitation is effected by feeding this exterior electrode 9 with high frequency current from an oscillator 10. The frequency of the oscillator may be crystal-controlled at about 30 megacycles. This frequency is rather arbitrary and not critical, though desirably constant to produce uniformity of result. By using such high frequency energization substantially continuous ionization is provided, the interval between cycles being so short that deionization does not occur. The frequency of the order cited is very much higher than the chopping frequency which is used as hereafter described. To secure constant operation, the oscillator is energized by a regulated power supply 12. The power supply and oscillator may be of any suitable type such as commonly used for continuous wave radio communication purposes and they need, therefore, not be described in detail.

Considering first the tube 2, a quartz lens 14 of convex type effects projection of rays from the lamp 8 along the path indicated by construction lines, which path includes a reflecting mirror 16, a slit 18 in a mask 20, a mirror 22, and, conveniently, a half quartz lens 24, the whole effecting projection of the involved rays on the cathode of the multiplier photocell 26 which is diagrammed as a simple photocell though it will be understood that besides its cathode it contains the usual diodes and anode provided with supply current from a conventional type of source. This multiplier photocell is operated in accordance with the conventional good practice, though in view of the nature of the operation here involved, the extreme precautions in operation sometimes used with multiplier photocells are not necessary.

Using a long tube 2, it will be evident that the path of the illumination therethrough is roughly three times its length, and a long length of tube is desirable in the case of each of tubes 2 and 4, which involve identical optical paths, so that interposed in the case of the latter tube there is a maximum amount of mercury vapor. The length of the tubes, however, is limited by practical considerations of thermal and mechanical stability.

The lens 14 is of suitable long focal length so as to focus the line image of the lamp 8 on the slit 18 by way of the mirror 16. Desirably the mask 20 is adjustable by conventional means (not shown) so that a sharp focus on the slit 18 is achieved at the 2537 A. band which is desirably used. Because of the fact that the lens 14 is not achromatic, peripheral rays from illumination at other wave lengths will not be brought to a sharp focus at the slit which is desirably very narrow, and consequently a large percentage of this other radiation will be blocked off by the mask. Axial rays are desirably blocked off by central masks on or near the lens since axial rays of all wave lengths would pass through the slit. While the monochromator action thus secured is far from perfect, there is achieved a considerable increase in the ratio of the desired illumination at 2537 A. to the other illumination of both higher and lower wave lengths forming a background.

It may here be noted that further discrimination against the undesired background illumination may be achieved by the use of a multiplier photocell having relatively low sensitivity to unwanted wave lengths. Such a cell is Dumont K–1688 which is insensitive to illumination above 3000 A. and has only low sensitivity in the 2800 A.–3000 A. band, but has a high sensitivity in the reversible 2537 A. band.

An identical optical system is provided in the tube 4 by the lens 28, the mirror 30, the slit 32 in the mask 34, the mirror 36 and the half lens 38, the system being desirably arranged and focused as above described for the first system and directed on the same portion of the cathode of the multiplier phototube as receives the illumination from the first system. To secure balanced adjustments, with the same length of optical path, the mirrors 22 and 36 are desirably pivotally carried by sliding blocks 40 and 42 adjusted by the screws 44 and 46. It will be understood that the other elements of the systems are also made capable of small fine adjustments to secure identical paths and proper focusing.

A motor 48 drives a chopper disc 50 which is provided with radial slits 52 through which pass the beams from the lamp 8 to both of the optical systems. As will be evident from the positioning of the chopper disc shown in FIGURE 1, the two beams are alternately intercepted and passed so that alternating illumination is provided on the photocell 26. Desirably the slits are dimensioned so that when one ray is being passed the other is occulted, and vice versa, to give a maximum response as will shortly appear. Desirably the motor 48 is of a non-synchronous type, for example an induction motor with slip, so that, assuming a power supply for the system at a given frequency, the frequency of chopping does not have a common factor with the supply frequency. This aids, by reason of synchronous rectification, in suppressing stray signals which might emanate from the power supply which may be, for example, at 60 cycles or 400 cycles, or some other frequency as may be conveniently used.

The multiplier photocell 26 feeds a preamplifier 54 in conventional fashion, and the signals from the preamplifier are desirably filtered at 56 utilizing, for example, one or more parallel-T filters to suppress noise signals such as may originate from the alternating power supply. The filter 56 is followed by the amplifier 58 which feeds the synchronous rectifier 60 receiving a reference signal from the photocell 62 through the amplifier and phase shifter 64. The photocell 62 is illuminated from the lamp 8 through the slits 52. The technique of synchronous rectification is well-known and may be carried out as described in Shawhan Patent 2,559,173. Synchronous rectification gives rise to a direct, though possibly varying, output as the result of passage of the signals through a low pass filter 66 which feeds a recorder 68 to provide a recorded curve in conventional fashion.

What occurs in the synchronous rectification will be apparent from FIGURE 3 in which the graph A represents the input from the synchronous rectifier by reason of passing of illumination through tube 2 and graph B represents that resulting from the passage of the illumination through tube 4. The illustrated pulses resulting from the chopping are added together as indicated in graph C by impingement of the illumination from both tubes on the photocell 26. The result is to produce an alternating component having the period indicated at D. By synchronous rectification this gives rise to the direct output from the filter 66 to the recorder 68. The low duration transients are removed largely by filter 56 and substantially completely by the action of the synchronous rectifier.

Sampling is effected in the same fashion as described in our prior application. The air is drawn into the apparatus through a tube 74 by an air pump 106. Typically, in operation, a flow of air of around 1 to 10 liters per minute has been found desirable.

Whereas for preliminary investigation of a region the air may be drawn from an ambient atmosphere directly, in the more careful checking of a region it has been found desirable to provide shallow holes such as indicated at 77, having a depth of approximately a foot in the dry earth. A cover 70 is provided to close the upper end of the hole and mercury-free air is drawn to the bottom of the hole through a mercury-absorbing chamber 71 and a tube 72 and removed at its upper end through the tube 74. The chamber 71 may contain an absorbing material of the type referred to hereafter. By proceeding in this fashion there is typically secured a ten-fold betterment of concentration of mercury in the air entering the apparatus. In explanation of this, it may be stated that apparently above a deposit containing mercury the earth contains liquid mercury. That this is the case seems to follow from the fact that, as measured in the ambient atmosphere, the mercury concentration varies with diurnal temperature changes, the concentration being relatively low at night when the earth is cool and rising as the earth heats up during the day, the mercury apparently undergoing successively evaporation and absorption or condensation. Rain lowers the concentration of mercury in the atmosphere and a wet surface apparently blocks the evaporation so that measurements are desirably made in dry weather and during the day when the earth is relatively warm. It will be evident that by drawing the mercury vapor from a hole such as 77 an aspect of a higher concentration exists and particularly independence of the effects of wind which may create major disturbances in readings. The absorption chamber 71 eliminates the disturbing variations of mercury concentration in the ambient atmosphere.

The tube 74 leads to a T 76 connected at one side to a tube 78 which leads through a valve 80 to a mercury-absorption chamber 82, in turn connected to an inlet to the tube 2 through connection 84. The absorption tube 82 may be bypassed, for calibration purposes, by a line 88 containing a shut-off valve 90 and also an adjustable valve 91.

The other side of the T 76 is connected through tube 92 and an adjustable valve 93 to a dummy chamber 94 containing a material 96, the tube 94 being connected to the inlet of the tube 4 through connection 98.

The tubes 2 and 4 are connected to the respective outlet tubes 100 and 102 for withdrawal of the air therefrom, and these are joined at a T 104 connected to the inlet of the air pump 106. In our prior application the air thus withdrawn was cleaned of mercury and then passed through housings enclosing the ultraviolet source and a pair of photocells. While a similar arrangement may be used in the present apparatus, it may be dispensed with because of the fact that essentially a single portion of the source gives rise to the illumination and the two optical systems direct the illumination on the same area of the photocell cathode. Thus, irrespective of ambient conditions, the illumination paths are substantially identical with respect to their portions exterior to the tubes 2 and 4.

The mercury-absorption chambers 71 and 82 contain highly effective absorption media for the specific removal of mercury from the flowing air as compared with any other contents of the air. Useful for this purpose is glass wool having its fibers coated with pure gold. A coating of silver may also be used but this is not as desirable as gold because of its susceptibility to formation of silver sulphide under the action of hydrogen sulphide content of the air, though it may be used in sulphur-free and chlorine-free atmospheres. Other metals which are characterized by wettability by and some solubility in mercury may be used, but none has been found to be more effective than gold. The gold may be deposited on the glass wool by ordinary and convenient deposition methods, for example by merely wetting the wool with a gold salt, such as chloride, and decomposing the salt by heat for deposition of the gold. There may be used, in place of glass wool, nickel wool on which the gold is deposited in the same fashion or by precipitation by the nickel from a solution of a gold salt. A difficulty with glass wool is that glass will absorb, to some extent, mercury, and consequently the dummy chamber 94, containing the same amount of glass wool but uncoated, will be required to be saturated to the extent of this absorption before use. In the case of nickel, however, the absorption of mercury is negligible. Other carriers of gold or silver may also be used, such as alumina, completely coated to prevent absorption of water. The general properties of the carrier should be that of a physical form to present a maximum absorbing surface of the noble metal per unit volume, reasonably low resistance to flow, adhesion to its absorbent coating, and nondestructible by heat used to drive off mercury. In itself, it should be non-absorptive of mercury, or at least exhibit uniform absorption thereof. The last property may be best described by saying that the carrier should be non-wettable by mercury. It should, so as to be usable in the dummy chamber, be non-absorptive of other substances which absorb the radiation bands absorbed by mercury. The noble metal coating on the carrier should be very thin, ranging from a small fraction of a thousandth of an inch to not more than a few thousandths. The reason for the latter limitation is that if a thick coating of gold, for example, is used, the absorbed mercury will diffuse deeply thereinto and will not be driven off completely in regeneration of the absorbent by heat at moderate temperatures.

The reason for the dummy chamber 94 is that there should be interposed between the T 76 and the T 104 two branch passages for the air which involve substantially the same resistance to air flow during measurement. The reason for this is that the apparatus compares the samples at any instant in the tubes 2 and 4 and it is desirable, therefore, that the sample of air which is drawn into the apparatus and which enters the T 76 should appear in both tubes simultaneously and leave simultaneously so that the mercury-containing and the mercury-free air in these tubes should come from the same sample of the source. Accordingly, the dummy chamber 94 contains the same fibrous material 96, glass wool, nickel wool, alumina or other carrier uncoated, as is used in the chamber 82 similarly packed.

The operating tubing should, of course, involve substantially identical lengths in the tube branches to insure the same symmetry of flow.

While balancing must precede operation, the aspects thereof will be best appreciated following description of the normal measuring operation, and hence reference to the balancing matters will be deferred.

Assuming that the apparatus is balanced electrically, mechanically, optically, and pneumatically, operation is as follows:

Air drawn through the tube 74, either directly from the atmosphere or from a hole in the earth such as 77, passes to the T 76 and is there equally divided from the standpoint of flow so that half of it passes through tube 78 and the other half passes through the tube 92. Valve 90 at this time is closed, and valve 80 is open. The air passing through the chamber 82 has substantially all of its mercury content removed by the absorbent 83 and hence the sample passing through the tube 2 will be substantially mercury-free. There may remain minute residual amounts of mercury but these are negligible and, in any event, taken into account in calibration, considering that what is of interest are only amounts of mercury of significance, indicating, for example, the presence of areas giving rise to substantial, though minute, quantities of mercury in the incoming air.

The half of the flow which passes through tube 92 and flows through chamber 94 does not have its mercury removed and hence the sample flowing through tube 4 contains substantially the original mercury content of the air. The result is that there is a differential absorption of the characteristic illumination particularly of the wavelength band 2537 A. The amount of this absorption is substantially linearly proportional to the mercury present in the air in tube 4. The illumination on the photocell 26 from the two paths differs, therefore, in the content of the absorption band and chopping produces pulses of different amplitudes as indicated at A and B both received by the photocell to provide effective illumination as indicated at C. (It will be understood that the pulses indicated in FIGURE 3 are much exaggerated in the matter of their different amplitudes for clarity of showing.) The result is the production of an alternating signal of period D, the amplitude of which is substantially proportional to the concentration of mercury in the air being sampled. This alternating signal by reason of the filtering, amplification and synchronous rectification followed by final filtering gives rise to the direct signals which are recorded. Because of the fact that the optical paths are identical to a high degree of accuracy, and the electrical path is common to both of the optical signals, extreme sensitivity against background disturbances is secured.

The use of a high chopping frequency obviously compares the pulses A and B over quite short periods of time so that changes in both intensity of illumination by the tube 8 and in sensitivity of the multiplier photocell are substantially eliminated as factors which would adversely affect results. While direct current drifts of a multiplier photocell are ordinarily serious, the fact that it is operating to produce alternating signals as the result of alternating illumination practically eliminates the effects of direct current drift. Amplification is only slightly altered by the direct current drifts so that a high stability of operation for alternating signals is secured.

The drawing of samples directly from the atmosphere or from a hole in the earth has been described. The apparatus may also be used, in prospecting, in another fashion particularly where collection of samples by airplanes is involved, in which samples the mercury content may be particularly low. In such case the apparatus may be in a laboratory, and the collected samples may be drawn over an absorbent material such as gold or silver (using an absorbent such as that at 83 already described), the absorbent with collected mercury being then taken to a laboratory wherein the absorbent may be heated to drive off mercury vapor which is entrained in air drawn into the apparatus and subjected to analysis as described above. In this way a high concentration of mercury may be secured for purpose of measurement. This expedient of intervening concentration of mercury may be used in other cases where mercury concentration is very low.

Reference may now be made to matters of adjustment and calibration. These steps may be carried out in various fashions. Initial zero adjustment may be achieved by closing valve 80 and opening fully valve 90 so that air, possibly containing mercury, may pass through both tubes 2 and 4. Under these conditions the phase shifter at 64 and the mirrors 22 and 36 are adjusted to secure as nearly as possible a zero output recorded at 68. It will be understood, of course, that the masks 20 and 34 are adjusted as well as the mirrors 16 and 30 to secure proper optical alignment, together with focusing of the image of the source on the slits 18 and 32 with respect to the absorption band. Valves 91 and 93 may be adjusted to throttle the flows for equalizing flow rates during the adjustments.

Following this, the valve 90 may be closed and valve 80 opened and the apparatus may be tested for stability and equality of flow changes most conveniently by introduction into tube 74 of mercury-free air into which small amounts of acetone may be introduced. The reason for the use of acetone is that it exhibits absorption in the ultraviolet band of interest around 2537 A. but at the same time is not absorbed by the absorbent 83. If slight differences of flow are observed, detected by transient responses as samples of acetone are introduced, adjustment of valve 80 may be made to produce the same flow through both of the alternate paths of the apparatus. It may be remarked that to make this possible the flow path through the chamber 94 may be made initially slightly more resistant than that through the chamber 82 with the valve 80 open so that this valve, a finely adjustable needle valve, can be used for flow balancing.

Finally, the apparatus may be calibrated for content of mercury by injecting into a measured volume of air to be drawn into the apparatus small and measured samples of air of known mercury concentration such as may be obtained from an ambient atmosphere above liquid mercury at a known temperature.

Residual mercury may be baked out of the apparatus by the provision of heating coils, not shown.

If glass wool is used at 96, it is generally desirable to saturate the glass with mercury vapor since glass does absorb minute amounts thereof. The mercury absorbents may be regenerated after extended use to increase their capacity for absorption of mercury by baking them to drive off what has been absorbed. Various expedients to stabilize the apparatus against mercury accumulation will be obvious.

The apparatus as described is quite specific to mercury. Substances other than mercury in the sampled air, and which might exhibit absorption of the ultraviolet illumination, pass through the apparatus branches equally and give no differential response. The gold absorbent is quite inert for all such substances. Alloys of gold and silver may be used if these are sufficiently high in gold content so as not to be affected by hydrogen sulfide. Silver alone may be used, though its effective life is shortened by formation of sulfide.

Various changes in the apparatus may be made without departing from the invention. While a low pressure mercury vapor source is most desirable because of its high emission in the 2537 A. band, other sources, e.g. a broad band flame source having substantial emission in this band may be used, though generally such sources will give a high background of useless radiation and would require for practical results the use of a monochromator more effective than the type described to increase the content of useful radiation.

It is desirable that the air streams be kept moving.

If attempts are made to measure stationary samples several disturbing factors may exist. A stagnant sample may give up mercury to the walls of the measuring chamber; or alternatively mercury in or on these walls may be given up to the sample. But one principal reason for avoiding stagnant samples is that the radiation at 2537 A. converts oxygen to ozone which is somewhat more absorptive of this band than oxygen. But even worse, ozone formation leads to oxidation of mercury to mercuric oxide which is non-volatile and would interfere with measurements by forming dust particles. By maintaining flow these disturbing matters are minimized by rapid washing out of the disturbing materials from the measuring chambers and by minimizing the exposures of the samples of mercury-depositing or mercury absorbing actions.

Consistent with maintaining flow and the balanced operation the travel path of the air may be modified to feed the measuring chambers in series rather than in parallel. In this modification a sample of air containing mercury may be passed first through the measuring tube 4, and then in series through the absorbing chamber 82 and the measuring tube 2, from which it may pass to line 104. The results of this procedure are satisfactory when the air drawn in remains substantially constant in mercury content and in content of other radiation absorbing vapors. But the split stream arrangement first described is considerably better, always comparing against each other samples having the same time origin. In the series arrangement, furthermore, pressure drops involved cause differences in pressures, though slight, in the two measuring chambers.

Another alternative which may be used may involve the use of independent streams of air, originating in the same region of the atmosphere or in the same hole such as 77 but advanced by a pair of pumps operating at the same displacement rate (i.e. identical pumps driven by the same motor), the independent streams flowing through the respective measuring chambers with prior removal of mercury from one of the streams.

It will be clear that various other changes in details of the apparatus may be made without departing from the invention as defined in the following claims.

What is claimed is:

1. Apparatus for the detection of mercury vapor in a gas comprising
   a source of ultraviolet light absorbable by mercury vapor,
   a pair of light transmitting chambers,
   an electrically photosensitive element responsive to ultraviolet light from said source,
   means associated with said source, said chambers and said photosensitive element to provide substantially equal length paths for light from said source to said photosensitive element through the respective chambers,
   means for producing alternation of light along said respective paths,
   means responsive to alternating signals originating in said photosensitive element due to the operation of the last mentioned means, and
   means providing gas samples from the same source to said chambers,
   said providing means including means for extracting only mercury from one of said samples,
   means for passing the last mentioned sample through one of said chambers after the extraction of mercury therefrom, and
   means for passing the other of said samples through the other of said chambers.

2. Apparatus for the detection of mercury vapor in a gas comprising
   a source of ultraviolet light absorbable by mercury vapor,
   a pair of light transmitting chambers,
   an electrically photosensitive element responsive to ultraviolet light from said source,
   means associated with said source, said chambers and said photosensitive element to provide substantially equal length paths for light from said source to substantially the same sensitive area of said photosensitive element through the respective chambers,
   means for producing alternation of light along said respective paths,
   means responsive to alternating signals originating in said photosensitive element due to the operation of the last mentioned means, and
   means providing gas samples from the same source to said chambers,
   said providing means including means for extracting only mercury from one of said samples,
   means for passing the last mentioned sample through one of said chambers after the extraction of mercury therefrom, and
   means for passing the other of said samples through the other of said chambers.

3. Apparatus for the detection of mercury vapor in a gas comprising
   a source of ultraviolet light absorbable by mercury vapor,
   a pair of light transmitting chambers,
   an electrically photosensitive element responsive to ultraviolet light from said source,
   means associated with said source, said chambers and said photosensitive element to provide substantially equal length paths for light from said source to said photosensitive element through the respective chambers,
   means including a chopper interposed in said paths for producing alternation of light along said respective paths,
   means responsive to alternating signals originating in said photosensitive element due to the operation of the last mentioned means, and
   means providing gas samples from the same source to said chambers,
   said providing means including means for extracting only mercury from one of said samples,
   means for passing the last mentioned sample through one of said chambers after the extraction of mercury therefrom, and
   means for passing the other of said samples through the other of said chambers.

4. Apparatus for the detection of mercury vapor in a gas comprising
   a source of ultraviolet light absorbable by mercury vapor,
   a pair of light transmitting chambers,
   an electrically photosensitive element responsive to ultraviolet light from said source,
   means associated with said source, said chambers and said photosensitive element to provide substantially equal length paths for light from said source to said photosensitive element through the respective chambers,
   means for producing alternation of light along said respective paths,
   means, including a synchronous rectifier synchronized with said alternation of light, responsive to alternating signals originating in said photosensitive element due to the operation of the last mentioned means, and
   means providing gas samples from the same source to said chambers,
   said providing means including means for extracting only mercury from one of said samples,
   means for passing the last mentioned sample through one of said chambers after the extraction of mercury therefrom, and
   means for passing the other of said samples through the other of said chambers.

5. Apparatus for the detection of mercury vapor in a gas comprising
a source of ultraviolet light absorbable by mercury vapor,
a pair of light transmitting chambers,
an electrically photosensitive element responsive to ultraviolet light from said source,
means associated with said source, said chambers and said photosensitive element to provide substantially equal length paths for light from said source to said photosensitive element through the respective chambers,
the last mentioned means including monochromator devices in each of said paths to increase the relative intensity of light of a predetermined wave length with respect to the total illumination reaching said photosensitive element,
means for producing alternation of light along said respective paths,
means responsive to alternating signals originating in said photosensitive element due to the operation of the last mentioned means, and
means providing gas samples from the same source to said chambers,
said providing means including means for extracting only mercury from one of said samples,
means for passing the last mentioned sample through one of said chambers after the extraction of mercury therefrom, and
means for passing the other of said samples through the other of said chambers.

6. Apparatus for the detection of mercury vapor in a gas comprising
a source of ultraviolet light absorbable by mercury vapor,
a pair of light transmitting chambers,
an electrically photosensitive element responsive to ultraviolet light from said source,
means associated with said source, said chambers and said photosensitive element to provide substantially equal length paths for light from said source to said photosensitive element through the respective chambers,
the last mentioned means including monochromator devices in each of said paths to increase the relative intensity of light of a predetermined wave length with respect to the total illumination reaching said photosensitive element,
each of said monochromator devices including a non-achromatic lens and a mask provided with an aperture at which the light of said predetermined wave length from the source is focussed,
means for producing alternation of light along said respective paths,
means responsive to alternating signals originating in said photosensitive element due to the operation of the last mentioned means, and
means providing gas samples from the same source to said chambers,
said providing means including means for extracting only mercury from one of said samples,
means for passing the last mentioned sample through one of said chambers after the extraction of mercury therefrom, and
means for passing the other of said samples through the other of said chambers.

References Cited by the Examiner

UNITED STATES PATENTS

| | | | |
|---|---|---|---|
| 1,746,525 | 2/30 | Darrah | 250—43.5 |
| 2,212,211 | 8/40 | Pfund | 250—43.5 |
| 2,411,672 | 11/46 | Van den Akker | 250—43.5 |
| 2,654,845 | 10/53 | Presenz | 250—43.5 |
| 2,688,090 | 8/54 | Woodhull et al. | 250—43.5 |

RALPH G. NILSON, *Primary Examiner.*